Patented Feb. 7, 1939

2,146,671

UNITED STATES PATENT OFFICE 2,146,671

ADDUCT RESIN COMPOSITIONS AND PROCESS OF MAKING SAME

Carleton Ellis, Montclair, N. J., assignor to Ellis-Foster Company, a corporation of New Jersey No Drawing. Application December 5, 1935, Serial No. 53,108

15 Claims. (Cl. 260—22)

It has been known in the past that maleic acid or anhydride will add to fatty oils, such as tung or oiticica, or their free acids, to give adducts which are in effect polybasic acids.

This invention relates particularly to synthetic resins produced by reacting polybasic acids thus or analogously obtained, or their partial esters, or mixtures of any of these, with substantially chemically equivalent proportions of polyhydric alcohols such as glycol, glycerol, polyglycols and polyglycerols.

This is a continuation in part based on my copending applications Serial 549,334, filed July 7, 1931 Patent No. 2,033,131, and Serial 555,868, filed Aug. 7, 1931 Patent No. 2,033,132, wherein is described and claimed reaction products of drying oil adducts with alkalies, the present application being concerned with the reaction of fatty oil adducts with polyhydric alcohols to form resins.

The adduct resins thus obtained are generally tough, elastic, fusible, semi-solid masses usually soluble in toluol, butyl acetate, acetone, cellosolve, alcohol and similar solvents. The solutions on air drying give tacky films which on baking become hard, tough, relatively flexible, insoluble and infusible. The resins are miscible with nitrocellulose, rosin and rosin esters and the like, for which they serve in part at least as softening and flexing agents.

The following examples illustrate the preparation of resins and compositions therefrom to which this invention relates. All proportions are given as parts by weight.

*Example 1.*—100 parts of a tung-maleic adduct (prepared by adding 30 parts of maleic acid to 100 parts of tung oil at 160° C. and carrying the temperature to 280° C.) are mixed with 30 parts diethylene glycol and heated at 200° C. The oily liquid gradually thickens and after about 2 hours yields a reddish-brown, tough, elastic, fusible semi-solid resinous mass. The resin is soluble in toluol, acetone, butyl acetate, ethyl alcohol, cellosolve, and dioxan, and has an acid number of about 60. It is miscible with nitrocellulose, rosin and rosin esters.

*Example 2.*—100 parts of a tung-maleic adduct, prepared as in Example 1, and 20 parts ethylene golycol are mixed and heated at 120° C. for about 100 hours. The oily mixture gradually thickens yielding a tough, fusible and soluble semi-solid resinous product.

*Example 3.*—100 parts of a tung-maleic adduct, prepared as in Example 1, are refluxed with 16 parts ethyl alcohol for about 2 hours to form the equivalent of the tetraethyl ester (the tung-maleic adduct being considered a hexabasic acid) and heated with 25 parts diethylene glycol at 210° C. for about 1½ hours until a tough, fusible, soluble, semi-solid rubbery mass results. The acid number of this product is about 60.

*Example 4.*—100 parts of a tung-maleic adduct, prepared at in Example 1, and 16 parts glycerol are mixed and heated at 220° C. for about ¼ hour, in which relatively short time a tough, rubbery, fusible, semi-solid product results. Glycerol reacts faster than the glycols and the product has a strong tendency to gel, so that it is often difficult to stop the reaction at the soluble, rubbery stage. The intermediate product is soluble in xylol, butyl acetate, ethyl lactate, actone and collosolve.

*Example 5.*—100 parts of a tung-maleic adduct (prepared by adding 50 parts maleic acid to 100 parts tung oil at 160° C. and heating to 280° C.) are mixed with 45 parts diethylene glycol and heated at 220° C. for about 1½ hours, until a tough, fusible, soluble, semi-solid rubbery mass results. This product is firmer than that described in Example 1.

*Example 6.*—100 parts of a tung-maleic adduct (prepared by adding 7½ parts maleic acid to 100 parts tung oil at 160° C. and raising temperature to 280° C.) are mixed with 15 parts triethylene glycol and heated at 250° C. After about 1 hour a stick, fusible, soluble, semi-solid mass results which is less firm and less rubbery than the product in Example 1.

*Example 7.*—100 parts of a tung acids-maleic adduct (prepared by slowly adding 28 parts maleic anhydride to 100 parts tung oil free fatty acids at 160° C. and heating to 280° C.) are mixed with 60 parts triethylene glycol and heated at 250° C. The materials gradually thicken and after about 3 hours yield a reddish brown, tough, fusible, semi-solid, somewhat rubbery mass with acid number about 60. The resinous product is soluble in xylol, ethyl acetate, butyl alcohol, acetone and cellosolve, and is miscible with nitrocellulose, rosin and rosin esters.

The adduct of a fatty acid like eleostearic and an adduct-forming acid like maleic is a tribasic acid. It can be converted to a long-chain dibasic acid by esterifying one of the carboxyl groups of the maleic portion of the adduct with a monohydric alcohol. Further esterification of this dibasic acid (which is essentially an acid analogous to such compounds as substituted sebacic acids) with polyhydric alcohols, particularly glycols, results in highly extensible products.

*Example 8.*—The tung acids-maleic adduct, prepared as in Example 7, is dissolved in ethyl alcohol and neutralized with alcoholic sodium hydroxide. The solution is acidified with hydrochloric acid and the dibasic acid thus obtained is washed with water. 100 parts of this dibasic acid are mixed with 30 parts diethylene glycol and heated at 180° C. for about 4 hours until a tough, fusible, soluble, semi-solid, rubbery material results.

The preceding examples have utilized tung oil, but other fatty oils and their corresponding fatty acids can be substituted in certain cases. Oiticica and castor oils (also dehydrated castor oil) react readily with adduct-forming compounds. Also, cottonseed oil, perilla oil, corn oil and various fish oils can be used and, although their capacity for combining with maleic anhydride and the like is less than tung oil, homogeneous products of desirable properties are obtainable therefrom.

*Example 9.*—100 parts of an oiticica-maleic adduct (prepared by slowly adding 30 parts maleic acid to 100 parts oiticica oil at 160° C. and carrying temperature to 250° C.) are mixed with 30 parts diethylene glycol and heated at 200° C. for about 1½ hours. As reaction proceeded the oily mixture gradually thickened and yielded a tough, somewhat elastic, fusible, semi-solid resinous mass, soluble in xylol, butyl acetate, acetone, cellusolve and ethyl alcohol. The resinous product had an acid number of 60 and is miscible with nitrocellulose, rosin and rosin esters.

*Example 10.*—To 77 parts cottonseed oil at 200° C., 23 parts maleic acid are slowly added, followed by 30 parts diethylene glycol. The mixture is heated at 200° C. and after about 3 hours forms a semi-solid, homogeneous, resinous mass which is stringy and fusible. It is soluble in ethyl acetate, benzene, butyl alcohol, cellosolve and acetone, and miscible with nitrocellulose, rosin and rosin esters.

*Example 11.*—50 parts castor oil-maleic adduct (prepared by adding 30 parts maleic acid to 100 parts castor oil at 150° C. and heating to 250° C.) and 50 parts castor oil acids-maleic adduct (prepared by adding 25 parts maleic acid to 100 parts castor oil free acids at 150° C. and carrying temperature to 250° C.) are mixed with 35 parts diethylene glycol and heated at 200° C. for about 2 hours until a stringy, fusible, very viscous liquid results. It is soluble in toluol, butyl acetate, acetone, dioxan and ethyl lactate.

*Example 12.*—83 parts fish oil and 17 parts maleic acid are heated to 200° C. and 25 parts diethylene glycol are added. Heating is continued at this temperature for about 2 hours until a fusible, stringy, semi-solid resinous mass forms. This product is soluble in benzene, ethyl acetate, butyl alcohol, acetone and cellosolve. It is softer and less rubbery than the material described in Example 1.

Adduct-forming compounds analogous to maleic acid include the unsaturated acids such as fumaric, itaconic, citraconic, crotonic, acrylic and cinnamic acids and also acids which during reaction decompose to form unsaturated acids, for example, malic and citric. For special purposes the adduct-forming compound need not be an acid or acid anhydride but may include other bodies of appropriate unsaturated nature as acrolein, cinnamaldehyde, benzylidene-acetone or quinones.

*Example 13.*—77 parts tung oil and 23 parts maleic acid are mixed and heated at 200-200° C. until a homogeneous product results. 30 parts diethylene glycol are added and heating is continued for about 2 hours. During this period the oily materials are gradually converted to a tough, somewhat elastic, fusible, semi-solid resinous mass, soluble in acetone, xylol, butyl acetate, cellosolve and ethyl lactate.

*Example 14.*—100 parts of a tung-citric adduct (prepared by adding 50 parts citric acid to 100 parts tung oil at 200° C. and carrying temperature to 250° C.) are mixed with 35 parts diethylene glycol and heated at 200° C. for about 3 hours until a tough, stringy, fusible, semi-solid, resinous mass forms. It is soluble in toluol, ethyl acetate, acetone, cellosolve, and butyl alcohol and is miscible with nitrocellulose, rosin and rosin esters.

As previously stated a desirable use for the products of this invention is in coatings. However, it is not the intention to limit their application to coatings since the resinous substances can be used as binders or plasticizers in hot- or cold-molded compositions or in such materials as floor coverings and electrical insulation. As a basis for coatings the resin itself is employed and subsequently transformed to the insoluble-infusible condition by baking, or the resin is incorporated with an indurating agent such as a compatible cellulose ester or ether. Used as the film-forming ingredient of a coating composition the adduct resins may either be dissolved in a volatile organic solvent and hardened by baking, or they may be formed in situ as by mixing an aqueous alkaline solution of a fatty oil adduct with a polyhydric alcohol and baking the film to an insoluble state. Also, the polyhydric alcohol products of this invention are soluble in aqueous alkalies when the reaction is stopped at a point where the acid number is high (over 100) and the aqueous solutions of such high acid number adduct resins can be used as baked coatings. In all cases dyes and pigments are incorporated as desired.

Lacquers prepared by dissolving 1 to 3 parts adduct resin with 1 part nitrocellulose in a mutual solvent, such a butyl acetate, adhere well to a wide variety of materials, such as rubber, metals, hot-molded plastics and glass, and give tough flexible coatings which are quite resistant to water and dilute acids.

Water solutions of polyhydric alcohols and ammonium salts of the polybasic acids (maleic adducts) may be applied to tinned iron or other materials and baked until the resin is formed in place and converted to the infusible and insoluble state. Such coatings are hard, tough, flexible and very resistant to water and dilute acids, so that they are applicable for tinned cans or other containers. The water solutions of the products of this invention may be mixed with aqueous solutions of other alkyd resins or other synthetic resins. Also casein, glue, starch, gums, rubber latex and the like may be added.

*Example 15.*—A solution prepared by dissolving 100 parts diethylene glycol-tung-maleic resin (Example 1) in 200 parts toluol is applied to sheet steel and the coating is dried in air and baked at 160° C. for about 3 hours. The film thus produced is hard, tough, flexible and very resistant to water and dilute acids.

*Example 16.*—2 parts diethylene glycol-tung-maletic resin (Example 1) and 1 part nitrocellulose are dissolved in a mixture of 3 parts butyl acetate and 3 parts toluol. This lacquer applied to rubber, metals or other materials and dried at atmospheric temperatures gives hard, tough, flexible films which are very resistant to water and dilute acids. Films from this lacquer on tinned steel remained flexible after baking at 110° C. for 115 hours.

*Example 17.*—1 part triethylene glycol-tung acids-maleic resin (Example 7) and 1 part nirtocellulose are dissolved in a mixture of 3 parts butyl acetate and 3 parts toluol. The lacquer thus obtained applied to rubber, metals or other materials and dried at room temperature gives hard, tough and flexible films which are resistant to water. Films from this lacquer on aluminum foil remained flexible after baking at 110° C. for 115 hours.

*Example 18.*—To a mixture of 100 parts tung-maleic adduct (prepared as in Example 1) and 100 parts water, ammonium hydroxide is added with stirring until solution is effected and 16 parts glycerol are added. The solution is applied to sheet steel or other materials and baked at 160° C. for about 1 hour. Resin is formed in place on the surface of the material coated and converted to the infusible, insoluble state, giving a hard, tough, flexible film which is resistant to water and dilute acids.

*Example 19.*—100 parts tung-maleic adduct as described in Example 1 are reacted with ammonium hydroxide to form the ammonium salt which is dissolved in 100 parts water, and 30 parts diethylene glycol are added. The solution is applied to tinned steel or other materials and baked at 160° C. for about 2 hours. Resin is formed on the surface of the material coated and converted to the insoluble, infusible state, giving hard, tough and flexible film which is resistant to water and dilute acids.

The accompanying examples represent typical combinations of constituents and do not attempt to give all possible variations thereof. In any case maleic adducts of one or more fatty oils, or of their free acids or combinations of these may be employed. The proportions of adduct-forming compounds may be varied considerably, and polyhydric alcohols or combinations of these, as well as mixtures of polyhydric and monohydric alcohols, may be used, for example in the ratio of their chemical equivalents. Likewise, proportions of reacting ingredients as given are not specific but may be varied within fairly wide limits and yield products coming within the scope of this invention.

A wide range of temperatures may be employed in making the products. The lower limit is that more or less determined by the velocity of the reaction and similarly the upper limit by the boiling points or vapor pressures of the reacting materials. However, a relatively low temperature is preferable since it enables more accurate control so that the reaction may be stopped when esterification has advanced to such an optimum degree as to give soluble products whose solutions are of relatively low viscosity and not (except in special cases) so far as to yield products which are insoluble or difficultly soluble or whose solutions show unduly high viscosity.

Although a desirable method of making the products of this invention is by a two-stage process as shown in the above examples, the resins may also be made by heating all the ingredients in one step, for example, by heating a mixture of tung oil acids, diethylene glycol and maleic acid. Various agents to modify the properties of the adduct resin may be introduced into the reaction mixture or incorporated with the resinous substance after its formation. For example, rosin (abietic acid), benzoic acid, phthalic anhydride or succinic acid may be introduced, together with sufficient polyhydric alcohol to react therewith. Other modifying agents include phenol-aldehyde condensation products, such bodies being introduced into, or formed in, the reaction mixture, or incorporated subsequently.

The term "adduct" is utilized herein to cover the reaction product of a fatty oil or the acids of a fatty oil with a compound containing the —CO—C=C— group, more particularly an unsaturated acid containing the —CO—C=C— group.

What I claim is:

1. A soluble rubbery resin comprising the reaction product of a fatty oil and an acid capable of forming an adduct with said oil, and a polyhydric alcohol.

2. A soluble rubbery resin comprising the reaction product of the maleic-compound of a fatty oil and a polyhydric alcohol.

3. The product of claim 2 in which the fatty oil is castor oil.

4. A resinous composition comprising the reaction product of a fatty oil and an acid selected from the group consisting of maleic, fumaric, malic and citric acids, and a polyhydric alcohol.

5. Process of making a resinous composition consisting in heating at reaction temperature a polyhydric alcohol and the product formed by reacting a fatty oil and an acid capable of forming an adduct therewith.

6. Process of claim 5 in which the fatty oil is tung oil.

7. As a new chemical product: an alcohol ester of the reaction product of a siccative oil with a compound containing the —CO—C=C— group reactive therewith.

8. As a new chemical product: an alcohol ester of the reaction product of siccative oil acids with an acidic compound containing the —CO—C=C— group reactive therewith.

9. As a new chemical product: a polyhydric alcohol ester of the reaction product of a drying oil with an acidic compound containing the —CO—C=C— group reactive therewith.

10. As a new chemical product: a polyhydric alcohol ester of the reaction product of a semi-drying oil with an acidic compound containing the —CO—C=C— group reactive therewith.

11. A composition comprising the mixed monohydric and polyhydric alcohol esters of the reaction product of siccative oil acids with an acidic compound containing the —CO—C=C— group reactive therewith.

12. A polyhydric alcohol ester of the partial ester of the reaction product of siccative oil acids with an acidic compound containing the —CO—C=C— group partially esterified with a monohydric alcohol reactive therewith.

13. A composition comprising the hardened reaction product of a fatty oil and an acid capable of forming an adduct with said oil, and a polyhydric alcohol.

14. A composition containing the infusible, insoluble polyhydric alcohol esters of the reaction product of a siccative oil with a compound containing the —CO—C=C— group reactive therewith.

15. The ester reaction product of from 15 to 60 parts by weight of a polyhydric alcohol with a maleic acid reaction product of an oil component selected from the group consisting of tung oil, oiticica oil, castor oil, tung oil acids, oiticica oil acids, and castor oil acids, in the ratio of 7½ to 50 parts by weight of maleic acid to 100 parts by weight of oil component.

CARLETON ELLIS.